United States Patent [19]

Simmons

[11] Patent Number: 5,273,764
[45] Date of Patent: Dec. 28, 1993

[54] METHOD FOR DECREASING THE ALLERGENICITY OF PSYLLIUM SEED HUSK

[75] Inventor: Curtis T. Simmons, Kalamazoo, Mich.

[73] Assignee: Kellogg Company, Battle Creek, Mich.

[21] Appl. No.: 824,759

[22] Filed: Jan. 17, 1992

Related U.S. Application Data

[63] Continuation of Ser. No. 515,744, Apr. 30, 1990, abandoned.

[51] Int. Cl.$^5$ .............................................. B02C 23/14
[52] U.S. Cl. .................................... 426/231; 426/482; 241/9
[58] Field of Search .................... 241/6, 7, 8, 9, 10, 241/11; 426/482, 518, 231

[56] References Cited

U.S. PATENT DOCUMENTS

| | | | |
|---|---|---|---|
| 1,975,731 | 10/1934 | Parsons | 241/6 |
| 4,813,613 | 3/1989 | Salete | 241/11 X |
| 5,020,732 | 6/1991 | Bahrani | 241/7 |
| 5,048,760 | 9/1991 | Barbera et al. | 241/9 |

*Primary Examiner*—Mark Rosenbaum
*Assistant Examiner*—John M. Husar
*Attorney, Agent, or Firm*—Felfe & Lynch

[57] ABSTRACT

A method of reducing the allergenicity of psyllium seed husks. The method comprises selecting that portion of a quantity of coarsely ground psyllium seeds having a particle size greater than a predetermined particle size in order to selectively reduce the allergenicity of the psyllium seed husks. Preferably, the coarsely ground psyllium seeds are separated based on particle size by passing coarsely ground psyllium seed husks through at least one sizing means or screen, and preferably through at least two vertically aligned sizing means of decreasing opening size.

2 Claims, 1 Drawing Sheet

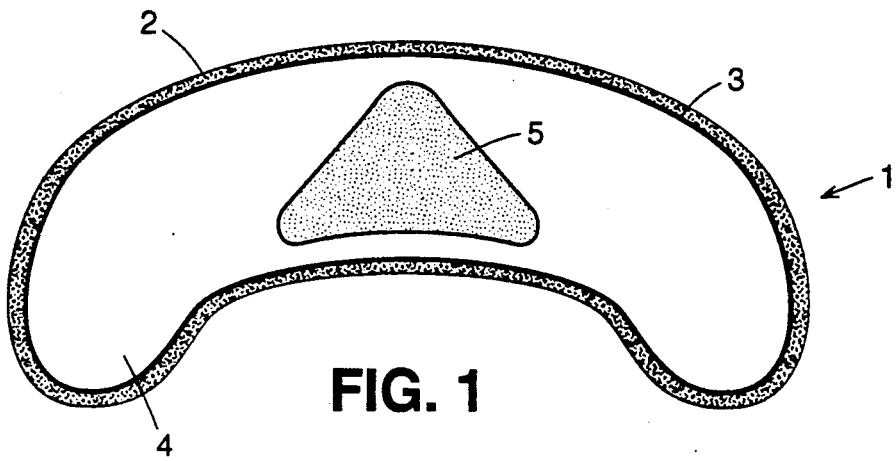
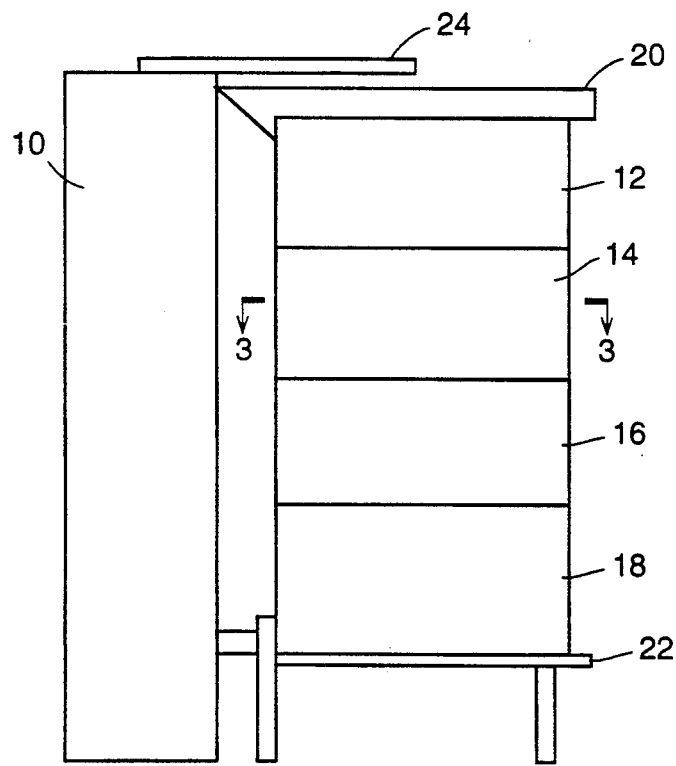
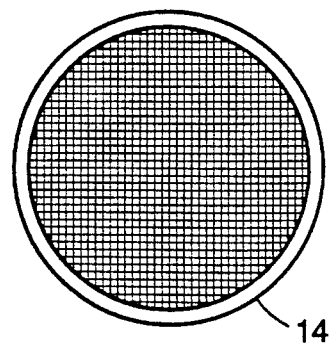

METHOD FOR DECREASING THE ALLERGENICITY OF PSYLLIUM SEED HUSK

This application is a continuation of U.S. patent application Ser. No. 07/515,744, filed Apr. 30, 1990, now abandoned.

BACKGROUND OF THE INVENTION

The present invention relates to a novel method for decreasing the allergenicity of psyllium seed husk.

Psyllium is a known mucilaginous material which has been used extensively in bulk laxatives. More recently, psyllium has been found to have a hypocholesterolemic effect if ingested by humans and lower animals.

The source of psyllium is the seeds from the plants of the Plantago genus, which grows in certain sub-tropical regions. The seeds are dark brown, smooth, boat-shaped and shiny. Since it is believed by those skilled in the art that the active ingredient of psyllium is the psyllium seed gum, which is located primarily in the seed husk, present technology uses the ground seed husk as the source for psyllium.

Generally, integral psyllium seeds are coarsely ground with crude grinding equipment in India and sub-tropical regions where the psyllium seeds originate in an attempt to separate the outermost husk material from the underlying pigmented seed coat layer of the psyllium seeds. In this crude grinding process, particles of various size from these layers end up mixed with one another as a function of the grinding process. Because of the type and condition of the grinding equipment and variability in the physical dimensions of the psyllium seeds themselves, it is common to have discreet pieces of the seed coat mixed in with the husk material.

Various methods and apparatus for obtaining high purity mucilage or husk material from psyllium seeds have been proposed. For example, U.S. Pat. No. 4,813,613 discloses complex apparatus for producing powdered psyllium seed husk including a plurality of impact grinding steps.

It has now been discovered that the seed coat material from psyllium seeds in general is high in protein content and contains specific protein fractions which contain allergens. The present invention provides a novel, convenient and simple method for physically separating psyllium seed husk into fractions ranging from very low to very high levels of allergenicity.

Accordingly, it is an object of the present invention to provide a method for decreasing the allergenicity of psyllium seed husk.

It is a further object of the present invention to provide a method for physically separating coarsely ground psyllium seed husk into at least two fractions of different allergenicity.

It is still a further object of the present invention to provide a method for producing a larger particle size fraction of psyllium seed husk having lower allergenicity than the standard 85% and 95% purity grades of psyllium seed husk commonly used in a variety of laxatives and food products.

Still another object of the present invention is to provide a method for separating seed coat material from psyllium seed husk to reduce the allergenicity of the psyllium seed husk.

Additional objects and advantages of the present invention will become apparent from the following detailed description, examples and accompanying drawings, wherein:

FIG. 1 is a cross sectional view of a psyllium seed;

FIG. 2 is an elevational diagrammatical view of a fractionation apparatus for carrying out the process of the present invention; and FIG. 3 is a cross sectional view taken along lines III—III of FIG. 2.

SUMMARY OF THE INVENTION

The present invention relates to a novel fractionation method for decreasing the allergenicity of psyllium seed husk. The method of the invention allows physical separation of coarsely ground psyllium seed husk into fractions ranging from very low to very high levels of allergenicity. The method of reducing the allergenicity of psyllium seeds in accordance with the present invention comprises coarsely grinding psyllium seeds; and then selecting that portion of the coarsely ground psyllium seeds having a particle size greater than a predetermined particle size in order to selectively reduce the allergenicity of the psyllium seeds.

According to a preferred embodiment of the present invention, the method comprises passing coarsely ground psyllium seeds through a plurality of sizing means of decreasing opening size and then recovering the portion of the coarsely ground psyllium seeds having a particle size greater than a predetermined particle size. In a most preferred embodiment of the present invention, coarsely ground psyllium seed husks are passed through a plurality of vertically aligned screens of decreasing mesh opening size and then at least a first fraction of the coarsely ground psyllium seed husks having a particle size greater than the mesh opening size of one of the screens is recovered, which first fraction has reduced allergenicity.

The method of the present invention also "cleans" the coarsely ground psyllium seed husk by separating the translucent husks from the dark colored seed coat.

DETAILED DESCRIPTION OF THE INVENTION

The inventive method comprises the steps of physically separating coarsely ground psyllium seed husk into at least two fractions of differing allergenicity. This physical separation is based on particle size and the larger particle size fraction of the separated psyllium seed husk has a lower level of allergenicity than the original quantity of coarsely ground psyllium seed husk and has a lower level of allergenicity than the smaller particle size fraction of the separated psyllium seed husk. The larger particle size fraction of the separated psyllium seed husk has reduced allergenicity due to the removal of discreet pieces of the seed coat of the psyllium seeds from the psyllium seed husk during the physical separation.

With reference to FIG. 1, a psyllium seed 1 comprises a husk 2, a colored seed coat (bran) 3, an endosperm 4 and a germ 5. In accordance with the present invention, the husk 2 is physically separated from particles of the remaining psyllium seed components, particularly the seed coat 3, to reduce the allergenicity of the psyllium seed husk 2.

The physical separation can be carried out by any suitable means. A particularly suitable means for separating the coarsely ground psyllium seed husk into fractions ranging from low to high levels of allergenicity comprises passing the coarsely ground psyllium seed husk through one or more sizing means having a known opening size. Screens or other known means for separating materials based on particle size are suitable for use in the present invention. One or more such sizing means can be used and it is especially preferred that at least two sizing means be used which are conveniently arranged in vertical alignment. Integral psyllium seeds are subjected to coarse grinding by any known method, prior to this physical separation.

An especially preferred apparatus for physically separating or fractionating coarsely ground psyllium seeds into a plurality of fractions ranging from low to high levels of allergenicity is shown in FIG. 2. This apparatus comprises a sieve shaker 10 such as a Ro-Tap Testing Sieve Shaker which uses three 8-inch diameter screens 12, 14, 16. Although the Ro-Tap Testing Sieve Shaker has been used in the practice of this invention, virtually any "dynamic action" type sieve shaker can be used with appropriate screens.

As shown in FIG. 2, the screens are arranged or stacked vertically, with the largest mesh opening screen 12 on top, followed by a screen of intermediate opening size 14, a screen of smallest mesh opening size 16 and a pan 18 for recovering the fraction of the psyllium seed husk which passes through the smallest mesh opening size screen 16 The sieve shaker 10 is provided with motor means (not shown) for imparting a vibratory or rotary motion to the stacked screens to enhance the flow of the psyllium seed husk through the stacked screens and with a hammer 24 for tapping the stacked screens. The screens 12, 14, 16 and pan 18 are vertically stacked and then mounted on the sieve shaker 10 by suitable mounting means or brackets 20, 22.

FIG. 3 is a cross sectional view along lines III—III of FIG. 2 and shows the mesh openings of the screen 14.

In an especially preferred embodiment of the present invention, fractionation apparatus comprising three stacked screens of decreasing mesh size from top to bottom is employed. In a most preferred embodiment of the present invention, the largest mesh opening size screen 12 is a U.S. #20 sieve, the intermediate mesh opening size screen is a U.S. #30 sieve, and the smallest mesh opening size screen is a U.S. #40 sieve. Of course, alternative combinations of screens, including any combination of mesh opening sizes and/or number of screens can be used depending on the desired allergenic attributes of the separated psyllium seed husk fractions retained on the screens or passing through to the pan under the screens.

In addition to having lower allergenicity, the larger particle size fractions of psyllium seed husk recovered by the method of this invention are also cleaner than the original coarsely ground psyllium seed husk due to the removal of discreet pieces of the dark colored seed coat from the psyllium seed husk. The psyllium seed husk is translucent and light colored, and discreet pieces of the colored seed coat mixed therewith impart an undesirable dark color to the psyllium seed husks. This cleaning of the psyllium seed husks is particularly advantageous from an aesthetic, and possibly taste, point of view when the psyllium seed husks are used in a food product such as a cereal.

The present invention can be further understood with reference to the following, non-limiting example.

EXAMPLE

A vertical stack of three screens and a pan was provided. The uppermost screen was a U.S. screen #20 having a sieve opening of 0.0331 inches. The intermediate screen was a U.S. screen #30 having a sieve opening of 0.0234 inches. The lowermost screen was a U.S. screen #40 having a sieve opening of 0.0165 inches. Two hundred grams of coarsely ground psyllium seed husk was introduced onto the uppermost screen of the vertically stacked screens and pan. The stack was then placed onto a sieve shaker, as shown in FIG. 2, and the sieve shaker was run for 60 seconds with the hammer. After this time, screened fractions were recovered from each of the three screens and the pan. These fractions were evaluated for their allergy-evoking response or allergenicity on a scale of 0 to 3, 0 being the lowest allergenicity rating and 3 being the highest allergenicity rating.

The unscreened sample of psyllium seed husk was a standard coarsely ground psyllium seed husk of 85% purity and had an initial allergenicity rating of 2. The fraction of the separated psyllium seed husk retained on the U.S. screen #20 had a 0 allergenicity rating. The fraction retained on the U.S. screen #30 had a 1 allergenicity rating. The fractions retained on the U.S. screen #40 and recovered in the pan both had an allergenicity rating of 2.

These results clearly demonstrate that fractions of psyllium seed husk of greatly reduced allergenicity can be produced by the present invention.

Although the invention has been described with reference to preferred embodiments and examples thereof, it is not intended that the present invention be limited to only those described embodiments. Modifications of these embodiments will undoubtedly be recognized by those skilled in the art and modifications to the present invention can be made without departing from the spirit and scope of the invention. Rather, the invention should be circumscribed by the scope of the appended claims.

What is claimed is:

1. Method for reducing the allergenicity of coarsely ground psyllium seed husk of 85% purity, comprising
    a) determining the allergenicity rating of said coarsely ground psyllium seed husk;
    b) separating said coarsely ground psyllium seed husk into discrete fractions by passing said seed husk through at least three progressively decreasing sized screens; and
    c) selecting the fraction with the lowest allergenicity rating.

2. Method of claim 1, wherein said screens comprise U.S. #20, U.S. #30 and U.S. #40 sized screens.

* * * * *